United States Patent
Takeuchi et al.

(10) Patent No.: US 7,580,224 B2
(45) Date of Patent: Aug. 25, 2009

(54) MAGNETIC HEAD SLIDER WITH REDUCED BEARING SURFACE AREA AND MAGNETIC DISK DRIVE

(75) Inventors: Yoshinori Takeuchi, Ibaraki (JP); Hidekazu Kohira, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 512 days.

(21) Appl. No.: 11/282,155

(22) Filed: Nov. 17, 2005

(65) Prior Publication Data

US 2006/0119986 A1 Jun. 8, 2006

(30) Foreign Application Priority Data

Dec. 3, 2004 (JP) .............................. 2004-350847

(51) Int. Cl.
G11B 5/60 (2006.01)
(52) U.S. Cl. .................................... 360/236.2
(58) Field of Classification Search ............... 360/236.3, 360/237
See application file for complete search history.

(56) References Cited

U.S. PATENT DOCUMENTS

| | | | |
|---|---|---|---|
| 6,057,983 A | 5/2000 | Kajitani | |
| 7,164,556 B2 * | 1/2007 | Kohira et al. | 360/235.7 |
| 2001/0019467 A1 * | 9/2001 | Otsuka et al. | 360/235.2 |
| 2005/0057848 A1 * | 3/2005 | Okasaka et al. | 360/97.01 |

FOREIGN PATENT DOCUMENTS

| | | |
|---|---|---|
| JP | 09-147340 | 6/1997 |
| JP | 11-144418 | 5/1999 |
| JP | 2000-076721 | 3/2000 |

* cited by examiner

*Primary Examiner*—Mark Blouin
(74) *Attorney, Agent, or Firm*—Townsend and Townsend and Crew LLP; Rambod Nader

(57) ABSTRACT

A compact slider has a reduced area of bearing surfaces, thus substantially decreasing a lifting force obtained through an air bearing characteristic. In one embodiment, a shallowly grooved surface and air bearing surfaces are disposed on an inflow side of a bearing surface of a slider. The air bearing surfaces are connected to each other through a connection air bearing surface. Side shallowly grooved surfaces are respectively disposed rearward of the air bearing surfaces. The side shallowly grooved surface extends up to a point near an outflow end. A center air bearing surface is disposed on the outflow end of the slider. A magnetic head is mounted on the center air bearing surface. A center shallowly grooved surface is disposed on an inflow side of the center air bearing surface. A deeply grooved surface is disposed at a center of the bearing surface. No cutting margins are provided on both sides of the slider. The air bearing surfaces on the inflow side therefore reach end faces in a width direction of the slider.

16 Claims, 8 Drawing Sheets

Fig. 1 1 B
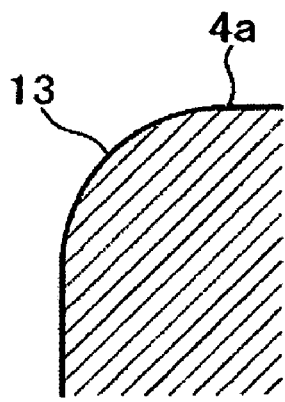
Fig. 1 2
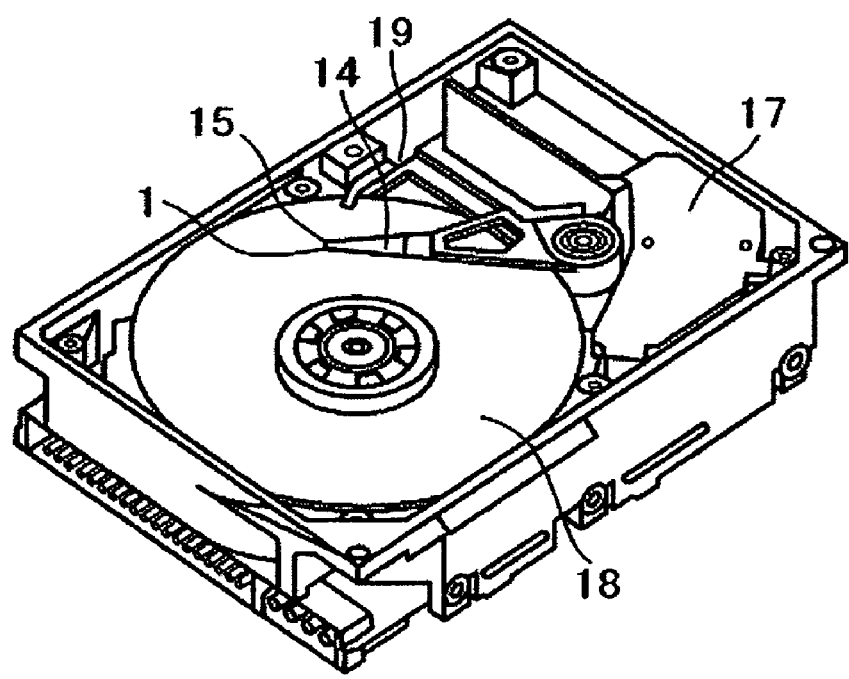

MAGNETIC HEAD SLIDER WITH REDUCED BEARING SURFACE AREA AND MAGNETIC DISK DRIVE

CROSS-REFERENCES TO RELATED APPLICATIONS

This application claims priority from Japanese Patent Application No. JP2004-350847,filed Dec. 3, 2004, the entire disclosure of which is incorporated herein by reference.

BACKGROUND OF THE INVENTION

The present invention relates generally to a magnetic head slider flying at a small distance above, or coming into intermittent contact with, the surface of a traveling recording medium and a magnetic disk drive. More specifically, the present invention relates to a magnetic head slider suitable for a magnetic disk drive using a small-diameter disk having a diameter of 45.7 mm (1.8 in.) or less.

The magnetic head slider is supported by a flexure attached to a suspension. The magnetic head slider flies at a small distance above, or comes into intermittent contact with, a magnetic disk to write and read data thereto and therefrom. Patent Document 1 (Japanese Patent Laid-Open No. 2003-123422) discloses the magnetic head slider that is currently widely used. FIG. 13 shows the construction of the conventional magnetic head slider disclosed in Patent Document 1. A medium opposing surface (bearing surface) 108 of a slider 101 includes three different kinds of surfaces: an air bearing surface 102 (102a, 102b, 102c), a shallowly grooved surface 104 (104a, 104b, 104c), and a deeply grooved surface 105. The shallowly grooved surface 104 includes a step slightly deeper than the air bearing surface 102. The deeply grooved surface 105 is a surface deeply grooved from the air bearing surface 102, even deeper than the shallowly grooved surface 104. The air bearing surface 102 includes a pair of right and left inflow side air bearing surfaces 102a, 102b and a center pad 102c. The pair of inflow side air bearing surfaces 102a, 102b are disposed on an air inflow side and in rear of the shallowly grooved surface 104. The center pad 102c is disposed on an air outflow end for mounting thereon a magnetic head 103. The shallowly grooved surface 104 includes a shallowly grooved surface 104a on the air inflow side, shallowly grooved rails 104b disposed on respective opposite sides, and a center pad shallowly grooved surface 104c. The center pad shallowly grooved surface 104c is disposed on the air inflow side of the center pad 102c. The deeply grooved surface 105 is substantially surrounded by the shallowly grooved surface 104a on the air inflow side, the inflow side air bearing surfaces 102a, 102b, and the shallowly grooved rails' 104b on the opposite sides. According to the construction of the magnetic head slider disclosed in Patent Document 1, the shallowly grooved surface 104a and the air bearing surfaces 102a, 102b provide a step air bearing function. This step air bearing function generates a lifting force causing the slider to fly above the magnetic disk. At the same time, the function produces a negative pressure on the deeply grooved surface 105. An appropriate air bearing stiffness is thus ensured to allow the slider to stably fly. The slider measures as follows: length Lx=1.25 mm; width Ly=1.0 mm; and height Lz=0.3 mm.

A recent trend in the magnetic disk drive is a shift toward a compact magnetic disk drive using a small-diameter disk to meet the need for high recording densities and with the aim of possible applications in compact digital equipment. Against this background, there is a problem of a decreasing effective data area on the surface of a circular disk. As an approach to solving this problem, there is known a method for reducing the slider in size. There has been developed a compact slider representing about 70% in dimensions of the aforementioned slider that is currently widely used. FIG. 14 is a plan view showing a compact slider. A slider 101 measures as follows: length Lx=0.85 mm; width Ly=0.7 mm; and height Lz=0.23 mm. This compact slider 101 results in the effective data area of the disk being widened by 0.3 mm. This can translate to a substantial improvement for a compact magnetic disk drive with a disk size of 25.4 mm (1 in.) or 20.3 mm (0.8 in.)

In addition, a reduction in size of the slider, or a reduction in a slider width and a slider height in particular, can almost double the number of sliders that can be taken from the same wafer size using the same magnetic head fabrication equipment. This yields a benefit of a reduced slider cost.

Conventionally, slider processing processes flow as described below. Specifically, bearing surfaces are lapped of a bar of about 40 sliders arranged in a horizontal row. The bearing surfaces are then formed through a dry process, such as ion milling or the like. The bar is then cut into individual sliders through chip cutting. Burrs and chipping therefore occur on the sides of the sliders from chip cutting. A protrusion with a height of more than 0.2 μm can occur on the side of the air bearing surface at these portions having the burrs and chips. There has therefore been a problem involved with extending the air bearing surface to both ends in the direction of slider width. The problem includes the burrs and chips impeding a stable flying action, which damages the disk, thus substantially degrading reliability.

In addition, stress relaxation occurs during chip cutting, which causes local deformation to occur at a chip cutting portion of a bearing surface 108. The profile is a recess having both ends protruding on the side of the recording medium. Local deformation can particularly be noticed on both sides of the slider. This local deformation causes fluctuations in a flying characteristic, impeding an approach toward a lower flying height and a stabled flying action. The local deformation also leads to damage to the circular disk due to possible contact during loading/unloading. The conventional process therefore defies extension of the air bearing surface up to side ends. A 30-μm-wide shallowly grooved surface 109 is provided on each of both ends of the inflow side air bearing surfaces 102a, 102b. A 30 μm-wide cutting margin portion 110 having the same depth as the deeply grooved surface 105 is provided on an outside of the 30 μm-wide shallowly grooved surface 109. A length L2 from the air bearing surface end to the slider end is 60 μm. A length L1 from the air bearing surface end to the shallowly grooved surface is 30 μm.

BRIEF SUMMARY OF THE INVENTION

Because of a reduction in size involved with the compact slider, an area of the bearing surface decreases, resulting in a lifting force by an air bearing characteristic being substantially decreased. A suspension load applied to the slider should also be made small in order to balance with the decreased lifting force. This trend is particularly noticeable in a low-speed 2.5-inch magnetic disk drive and a drive using a magnetic disk having a diameter of 45.7 mm (1.8 in.) or less, both having a low disk speed rating. This is because the lifting force by the bearing characteristic is directly proportional to the speed. The problem of the insufficient lifting force based on the air bearing characteristic does not occur in the conventional 3.5-inch magnetic disk drive or a high-speed 2.5-inch magnetic disk drive offering a magnetic disk speed of 5400 rpm, 7200 rpm, or the like. The problem of the reduced lifting force is new as it surfaces when magnetic disk drives using disks of small sizes of 25.4 mm (1 inch), 45.7 mm (1.8 inches), and the like have been put into practical applications. Problems arising from the substantial decrease in the lifting force include the following.

(1) The air bearing stiffness decreases, which degrades the flying characteristic of the slider. In particular, pitch stiffness (air bearing stiffness in a longitudinal direction of the slider) is proportional to the length to about the second power. A reduced slider length results in the pitch stiffness being substantially decreased. Thus, the flying height in a pitch direction severely fluctuates with disturbance vibration. In worst cases, part of the slider contacts the medium.

(2) Because of the necessity of minimizing the suspension load, shock resistance of the drive during operation is reduced.

(3) A slider used with both positive and negative pressures has two zones, a stable zone and a bi-stable zone. The stable zone is where a negative pressure is produced in a negative pressure area. In the bi-stable zone, the slider can take either one of the following two states, a high-flying mode and a low flying mode. In the high-flying mode, a positive pressure is produced even in the negative pressure area and the slider flies with a flying height of 1 μm or more. In the low flying mode, the slider flies with the originally designed flying height. In a system with small suspension loads, the slider enters the bi-stable zone, in which the high-flying mode occurs frequently, becoming unable to perform read or write operation.

(4) Assume that the slider contacts the disk on the inflow end at such a time as having the aforementioned disturbance vibration, when the flying height is reduced due to a decreased ambient pressure, or as during slider loading (hereinafter referred to as "pitch down"). If this occurs in a slider having a small suspension load and a short slider length, such a slider becomes unable to escape from the state. Then, the slider maintains that posture, being kept in contact with the disk. The slider thereby damages the portion of the disk in contact therewith, disrupting information. This could eventually result in a crash.

(5) A reduced bearing surface results in the negative pressure as well as the lifting force being reduced. Accordingly, a rate of reduction in the flying height relative to the decrease in the ambient pressure becomes large, thus eliminating a flying margin.

(6) When disk drives having high-disk-speeds, e.g., 7200, 10000, and 15000 rpm records servo information to the magnetic disk, the disk speed is lowered to ½ to ⅓ of the normal speed. With the conventional compact slider, the rate of reduction in the flying height relative to the speed is great and the flying posture is not stable. As a result, the conventional compact slider becomes unable to write servo information accurately because of the disk surface contact vibration involved. In extreme cases, the aforementioned pitch down occurs, resulting at times in a crash.

It is a feature of the present invention to provide a magnetic head slider capable of lessening reduction in a lifting force. It is another feature of the present invention to provide a magnetic disk drive having an improved shock resistance characteristic.

A magnetic head slider according to an aspect of the present invention comprises: a slider including: two air bearing surfaces disposed respectively in contact with both ends, on an air inflow side, of a medium opposing surface; a connection air bearing surface adapted to connect the two air bearing surfaces together on the air inflow side; a shallowly grooved surface disposed in contact with both the ends of the medium opposing surface between the two air bearing surfaces and the connection air bearing surface, and an air inflow end of the medium opposing surface; side shallowly grooved surfaces disposed respectively rearward of the two air bearing surfaces and in contact with both the ends of the medium opposing surface, and extending to points near an air outflow end of the medium opposing surface; a center air bearing surface disposed at a central portion in a width direction on the air outflow end of the medium opposing surface; a center shallowly grooved surface disposed on an air inflow side of the center air bearing surface; and a deeply grooved surface surrounded substantially by the two air bearing surfaces, the connection air bearing surface, the side shallowly grooved surfaces, and the center air bearing surface; and a magnetic head disposed on the center air bearing surface; wherein the slider has a width of about 0.8 mm or less and the medium opposing surface is flat or protrudent in the width direction.

In some embodiments, the slider has a length of about 0.85 mm, a width of about 0.7 mm, and a height of about 0.23 mm. A depth from the two air bearing surfaces to the shallowly grooved surface is 160 nm or less, a depth from the center air bearing surface to the center shallowly grooved surface is 160 nm or less, and a depth from the two air bearing surfaces and the center air bearing surface to the deeply grooved surface is 900 nm or less. The slider has corner deeply grooved surfaces, at the respective both ends on the air inflow end, which are deeper than the shallowly grooved surface. The corner deeply grooved surfaces are as deep as the deeply grooved surface.

A magnetic head slider according to another aspect of the present invention comprises: a slider including: two air bearing surfaces disposed respectively in contact with both ends, on an air inflow side, of a medium opposing surface; a shallowly grooved surface disposed around the two air bearing surfaces and in contact with an air inflow end and both the ends of the medium opposing surface; side shallowly grooved surfaces disposed rearward of the two air bearing surfaces and in contact with both the ends of the medium opposing surface, so as to cover areas up to points near an air outflow end of the medium opposing surface; a center air bearing surface disposed at a central portion in a width direction on the air outflow end of the medium opposing surface; a center shallowly grooved surface disposed on an air inflow side of the center air bearing surface; and a deeply grooved surface surrounded substantially by the shallowly grooved surface, the side shallowly grooved surfaces, and the center air bearing surface; and a magnetic head disposed on the center air bearing surface; wherein the slider has a width of about 0.8 mm or less and the medium opposing surface is flat or protrudent in the width direction.

In some embodiments, the slider has corner deeply grooved surfaces, at the respective both ends on the air inflow end, which are deeper than the shallowly grooved surface. The corner deeply grooved surfaces are as deep as the deeply grooved surface. The slider further includes extensions extending from the respective two air bearing surfaces in such a manner as to be opposite to each other.

A magnetic head slider according to another aspect of the present invention comprises: a slider including two air bearing surfaces disposed respectively on both sides on an air inflow side of a medium opposing surface; a connection air bearing surface adapted to connect the two air bearing surfaces together on the air inflow side; a shallowly grooved surface disposed in contact with both ends of the medium opposing surface between the two air bearing surfaces and the connection air bearing surface, and an air inflow end of the medium opposing surface; lateral shallowly grooved surfaces disposed respectively on both sides of the two air bearing surfaces and in contact with both the ends of the medium opposing surface; side shallowly grooved surfaces disposed respectively rearward of the two air bearing surfaces and in contact with both the ends of the medium opposing surface, so as to cover areas up to points near an air outflow end of the medium opposing surface; a center air bearing surface disposed at a central portion in a width direction on the air outflow end of the medium opposing surface; a center shallowly grooved surface disposed on an air inflow side of the center air bearing surface; and a deeply grooved surface surrounded substantially by the two air bearing surfaces, the connection air bearing surface, the side shallowly grooved surfaces, and the center air bearing surface; and a magnetic head disposed on the center air bearing surface; wherein the slider has a width of about 0.8 mm or less and the medium opposing surface is flat or protrudent in the width direction.

In some embodiments, the slider further includes inflow end pads disposed respectively on both ends of the air inflow end.

A magnetic head slider according to another aspect of the present invention comprises a slider including: two air bearing surfaces disposed respectively on both sides on an air inflow side of a medium opposing surface; a shallowly grooved surface disposed around the two air bearing surfaces and in contact with an air inflow end and both ends of the medium opposing surface; side shallowly grooved surfaces disposed rearward of the two air bearing surfaces and in contact with both the ends of the medium opposing surface, so as to cover areas up to points near an air outflow end of the medium opposing surface; a center air bearing surface disposed at a central portion in a width direction on the air outflow end of the medium opposing surface; a center shallowly grooved surface disposed on an air inflow side of the center air bearing surface; and a deeply grooved surface surrounded substantially by the shallowly grooved surface, the side shallowly grooved surfaces, and the center air bearing surface; and a magnetic head disposed on the center air bearing surface; wherein the slider has a width of about 0.8 mm or less and the medium opposing surface is flat or protrudent in the width direction.

In some embodiments, the slider has corner deeply grooved surfaces, at the respective both ends on the air inflow end, which are deeper than the shallowly grooved surface. The corner deeply grooved surfaces are as deep as the deeply grooved surface. The air inflow end is chamfered at each end portion thereof.

A magnetic disk drive according to another aspect of the present invention comprises a magnetic head slider including: a slider comprising two air bearing surfaces disposed respectively in contact with both ends, on an air inflow side, of a medium opposing surface; a connection air bearing surface adapted to connect the two air bearing surfaces together on the air inflow side; a shallowly grooved surface disposed in contact with both the ends of the medium opposing surface between the two air bearing surfaces and the connection air bearing surface, and an air inflow end of the medium opposing surface; side shallowly grooved surfaces disposed respectively rearward of the two air bearing surfaces and in contact with both the ends of the medium opposing surface, and extending to points near an air outflow end of the medium opposing surface; a center air bearing surface disposed at a central portion in a width direction on the air outflow end of the medium opposing surface; a center shallowly grooved surface disposed on an air inflow side of the center air bearing surface; and a deeply grooved surface surrounded substantially by the two air bearing surfaces, the connection air bearing surface, the side shallowly grooved surfaces, and the center air bearing surface, the slider having a width of about 0.8 mm or less and the medium opposing surface being flat or protrudent in the width direction; and a magnetic head disposed on the center air bearing surface; and a magnetic disk, to which data is written, or from which data is read by the magnetic head slider.

In some embodiments, the magnetic disk has a diameter of 45.7 mm or less.

According to the present invention, a pressing load to the compact slider can be increased by about 1.5 times as large as that of the conventional slider. Accordingly, the shock resistance characteristic during operation can be enhanced by about 1.5 times or more.

BRIEF DESCRIPTION OF THE DRAWINGS

FIG. 11B is a partly enlarged cross sectional view of FIG. 11A.

FIG. 12 is a perspective view showing a magnetic disk drive, in which the magnetic head slider according to the first to sixth embodiments of the present invention is incorporated.

DETAILED DESCRIPTION OF THE INVENTION

Specific embodiments of the present invention will be described in detail with reference to FIGS. 1 through 12. Various technically preferable restrictions are imposed on the preferred embodiments of the present invention to be described in the following. It should be noted, however, that the present invention is not limited to these embodiments and can be implemented in various manners without departing from the scope thereof.

Figure 1:
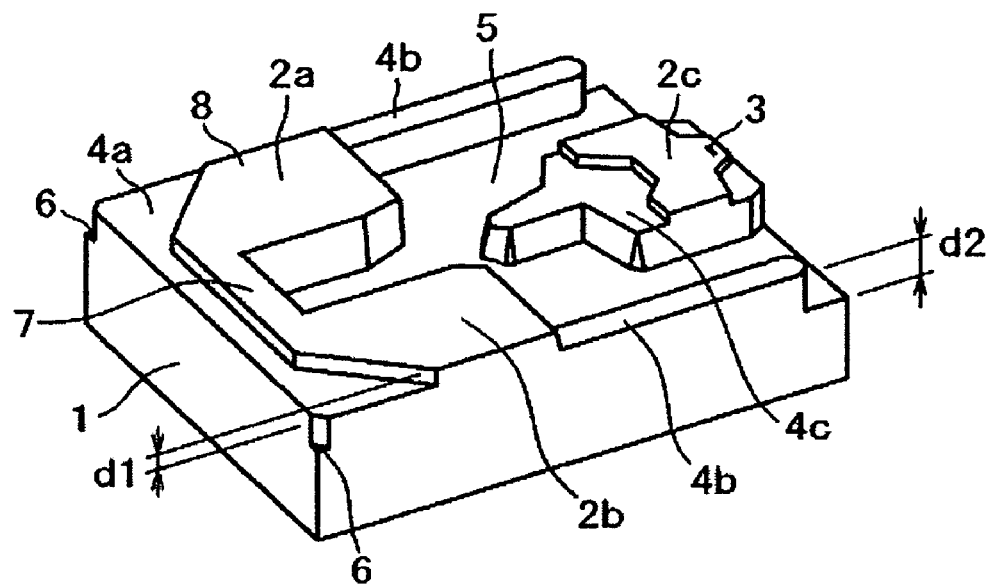
FIG. 1 is a perspective view showing air bearing surfaces of a magnetic head slider according to a first embodiment of the present invention.
Figure 2:
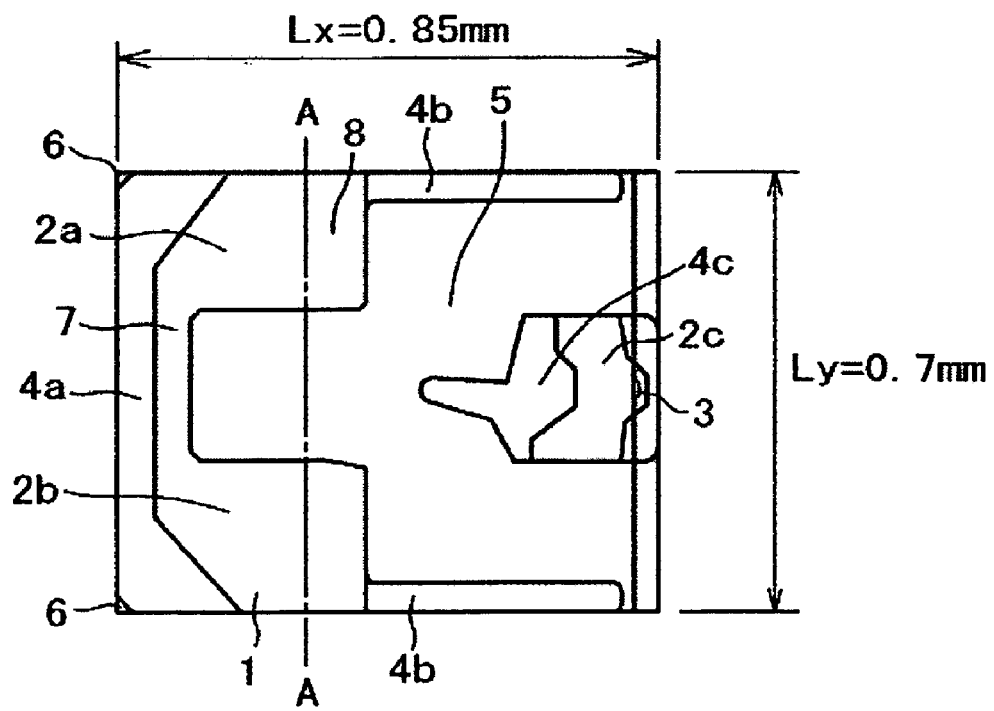
FIG. 2 is a plan view showing the air bearing surfaces of the magnetic head slider according to the first embodiment of the present invention shown in FIG. 1.

FIG. 1 is a perspective view of a magnetic head slider according to a first embodiment of the present invention. FIG. 2 is a plan view of the magnetic head slider. Referring to FIGS. 1 and 2, the magnetic head slider according to the first embodiment of the present invention is constructed as below so as to generate a lifting force by making use of an air bearing effect. Specifically, an inflow side shallowly grooved surface 4a is disposed on an inflow side of a medium opposing surface (bearing surface) of a slider 1. Further, a pair of inflow side air bearing surfaces 2a, 2b are disposed adjacent to, and rearward of, the inflow side shallowly grooved surface 4a. The inflow side air bearing surfaces 2a, 2b are connected together by a connection air bearing surface 7 on an inflow side thereof to provide a single air bearing surface. A side shallowly grooved surface 4b is disposed rearward of each of the pair of the inflow side air bearing surfaces 2a, 2b. The side shallowly grooved surfaces 4b extend along both sides of the slider up to points near an outflow end. A center air bearing surface 2c is disposed at a center in a width direction near the outflow end of the slider 1. A magnetic head 3 is mounted on the center air bearing surface 2c. A center shallowly grooved surface 4c is disposed on an inflow side of the center air bearing surface 2c. A deeply grooved surface 5 is substantially disposed at a center region of a bearing surface 8. The bearing surface 8 is substantially enclosed by the inflow side air bearing surfaces 2a, 2b, the connection air bearing surface 7, the side shallowly grooved surface 4b, and the center air bearing surface 4c. In addition, corner deeply grooved surfaces 6 are respectively disposed at corners on both sides on the inflow side. The corner deeply grooved surfaces 6 are as deep as the deeply grooved surface 5.

According to the first embodiment of the present invention, a slider length Lx is 0.85 mm, a slider width Ly is 0.7 mm, a depth d1 of the shallowly grooved surfaces 4a, 4b, 4c from the air bearing surfaces 2a, 2b, 2c is about 160 nm, and a depth d2 of the deeply grooved surface 5 from the air bearing surfaces 2a, 2b, 2c, 7 is about 900 nm. No cutting margins are provided on both sides of the slider. The inflow side air bearing surfaces 2a, 2b extend all the way up to respective end faces in the width direction of the slider. The inflow side shallowly grooved surface 4a and the side shallowly grooved surface 4b also extend all the way up to the respective end faces in the width direction of the slider. The inflow side shallowly grooved surface 4a is constructed such that a length thereof from an inflow end to the inflow side air bearing surfaces 2a, 2b is longer on both sides of the slider.

When the magnetic head slider 1 according to the first embodiment of the present invention is made to oppose a recording medium, the arrangement of the inflow side shallowly grooved surface 4a and the air bearing surfaces 2a, 2b, 7 causes the following to occur. Specifically, an air stream occurring as a result of rotation of the recording medium is compressed and, through the effect of air bearing, a lifting force is generated. The air stream expands, on the other hand, on the deeply grooved surface 5, and a negative pressure is generated. When this force by the air bearing balances a suspension load applied by a suspension not shown for supporting the magnetic head, the magnetic head slider 1 flies. The flying height is 15 nm or less at a location corresponding to the magnetic head 3.

Figure 5:
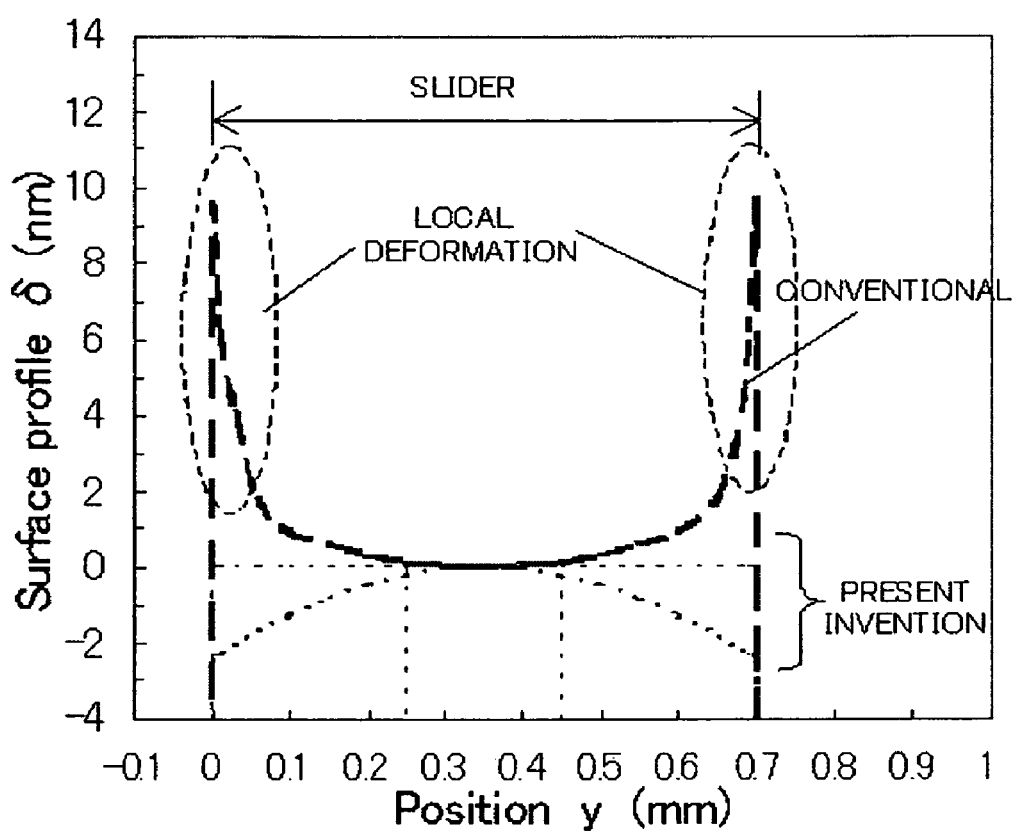
FIG. 5 is a view showing the flatness of the air bearing surface of the magnetic head slider in the width direction.
Figure 6:
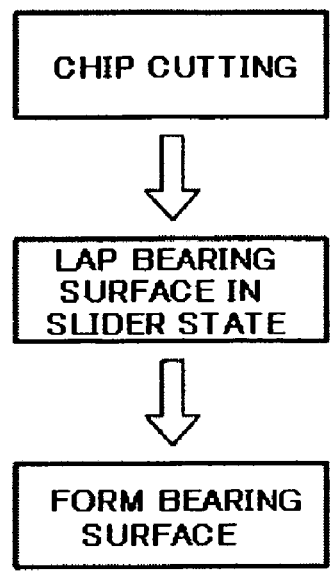
FIG. 6 shows processing steps applied to the magnetic head slider according to the embodiment of the present invention.

FIG. 6 shows processing steps for achieving the first embodiment described above. A bar of about 60 sliders arranged in a horizontal row is cut into individual sliders through chip cutting. The bearing surfaces of the cut sliders are then lapped. Portions protruding on the bearing surface side and local deformation on slider ends produced as a result of chip cutting are removed. The flatness of the slider in the width direction thereof is processed to zero (a flat surface) or to protrusions protruding on the side of the medium surface. Thereafter, the bearing surface is properly formed through ion milling or the like. FIG. 5 shows an example of the width-directional flatness of the bearing surface 8 of the slider processed through the processing steps. Conventionally, local deformation has been observed which reaches a dimension of about 10 run on both sides. The processing steps according to the embodiment of the present invention, however, eliminate protrusions on the ends and local deformation on the sides, producing a smooth flat surface or protruded surface. Accordingly, it is possible to form the air bearing surface extending up to both ends of the slider in the width direction.

Figure 3:
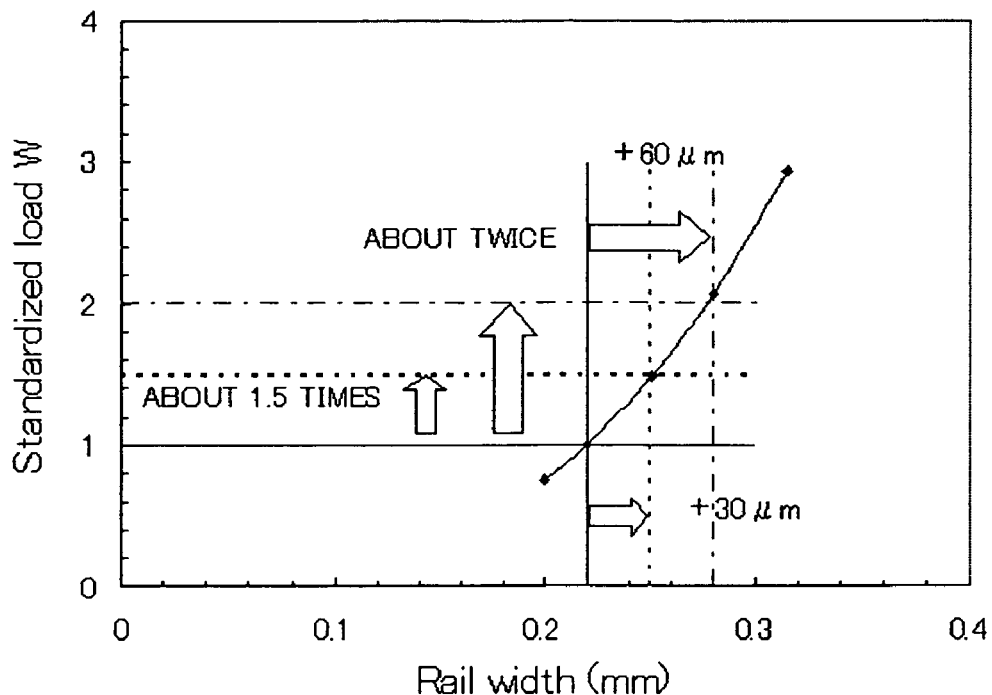
FIG. 3 is a diagram showing the relationship between the air bearing surface of the magnetic head slider and a load generated by an air bearing operation.
Figure 14:
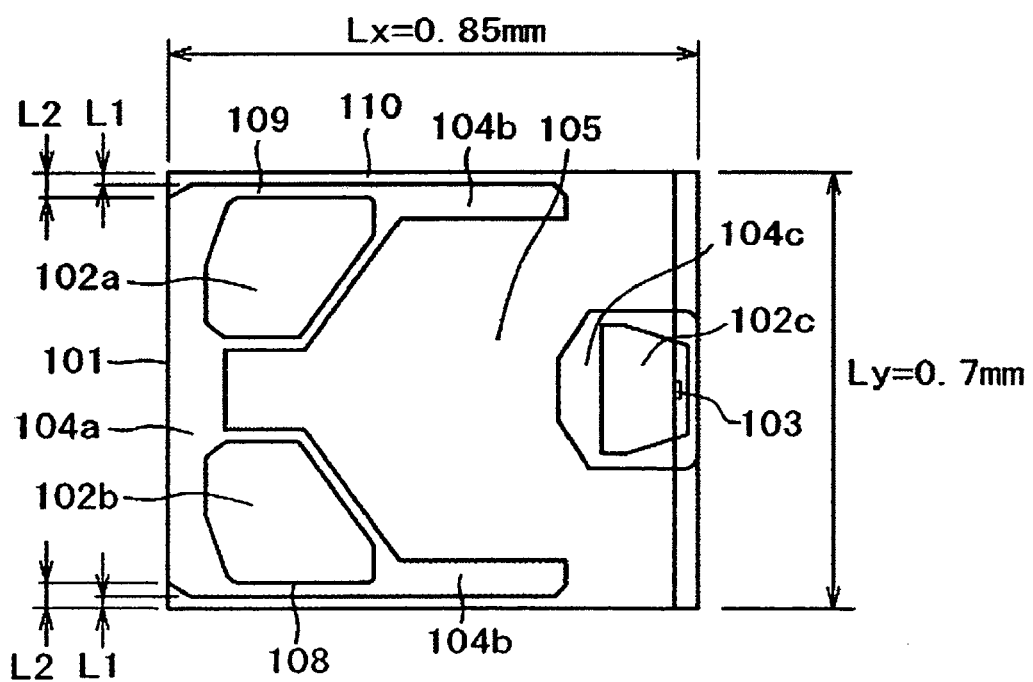
FIG. 14 is a plan view showing air bearing surfaces of a conventional compact magnetic head slider.

Referring to FIG. 2, in the magnetic head slider 1 according to the first embodiment, the inflow side air bearing surfaces 2a, 2b can be disposed to cover up to both ends of the slider in the width direction. The lifting force (load) generated through the air bearing is proportional to the air bearing surface width to about the third power. FIG. 3 shows the relationship in ratio between the air bearing surface width and load generated with the conventional level taken as 1. As a result, the air bearing surface width can be widened by 60 μm on each of both sides relative to the conventional slider having the same slider dimensions as shown in FIG. 14. The load to be generated can thereby be almost doubled. The load can be increased by about 1.5 times even with an enlargement width of 30 μm.

The magnetic head slider 1 flies through a balance between the aforementioned lifting force and the suspension load applied by the suspension not shown. Accordingly, the greater the lifting force can be made, the more the suspension load can be increased. The shock resistance of a magnetic disk drive during operation is involved with the conditions of a suspension load that a slider is not moved away from above a magnetic disk even by a force caused by acceleration applied externally. More specifically, it is involved with the relationship among an acceleration $\alpha$ applied externally, a mass m, and a suspension load W, which is given by the following equation: $W = m \alpha$ Increasing the suspension load for a slider of the same size makes the shock resistance greater proportionately. Accordingly, the shock resistance of the magnetic head slider according to the first embodiment of the present invention can be enhanced by an increment of the load (about double) as compared with the conventional level. In addition, enlarging the inflow side air bearing surfaces 2a, 2b up to both sides allows air bearing stiffness in the width direction to be increased and flying stability at a low flying height to be enhanced.

According to the first embodiment of the present invention, the inflow side air bearing surfaces 2a, 2b are connected through the connection air bearing surface 7. This arrangement allows the lifting force produced at this portion to be greatly increased. The length of the connection air bearing surface 7 may be made shorter than that of the inflow side air bearing surfaces 2a, 2b. This arrangement allows peaks of a positive pressure to be distributed on both sides, thus providing air bearing stiffness in the lateral direction. Moreover, since connecting the air bearing surfaces together increases expansion of air onto the deeply grooved surface 5, the negative pressure can be made larger. This ensures stable flying at a low flying height.

The lifting force (load) generated by the air bearing is substantially proportional to a disk speed. Accordingly, the magnetic head slider according to the first embodiment of the present invention exhibits a great effect in a disk drive having a small disk diameter and a low disk speed, which may be a disk drive having a diameter of 45.7 mm (1.8 in.) or less and a low disk speed.

The corner deeply grooved surfaces 6 disposed on the respective corners on the inflow side substantially lessen possible contact damage to the medium when the corners hit against the medium due to vibration of the slider during loading/unloading. The corner deeply grooved surfaces 6 can therefore assist in avoiding serious damage of a head crash.

Figure 4:
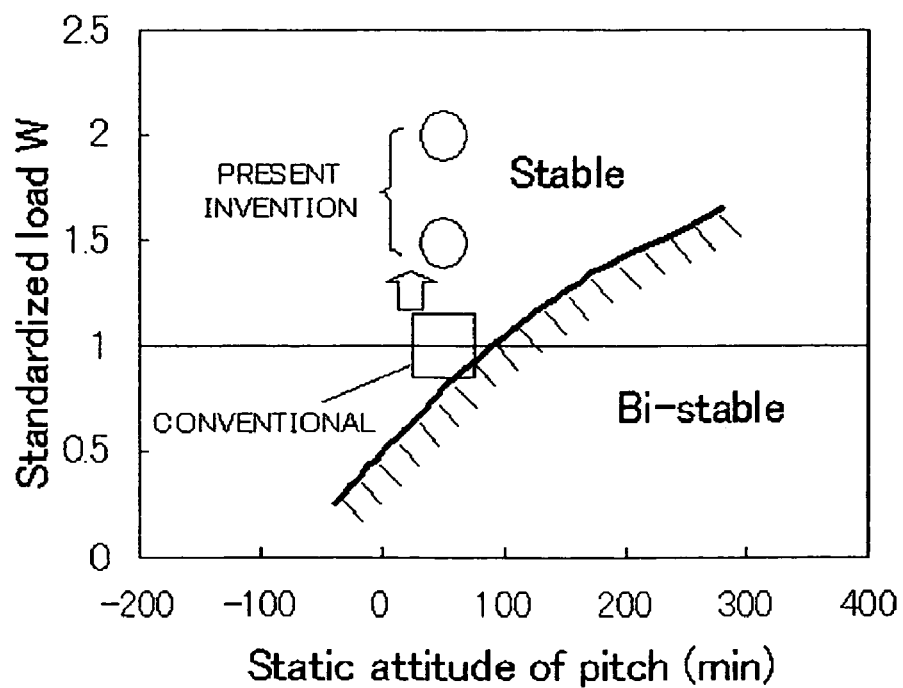
FIG. 4 is a diagram for explaining a margin relative to a bi-stable zone of the magnetic head slider.

FIG. 4 is an explanatory chart for a bi-stable phenomenon. With a slider using negative pressure, a negative pressure is produced on the deeply grooved surface 5. Such a slider undergoes the following two zones, the stable zone and the bi-stable zone. The stable zone is where the original stable flying is achieved. In the bi-stable zone, the slider can take either the high flying mode or the low flying mode. In the high flying mode, a positive pressure is produced even on the deeply grooved surface 5 and the slider flies with a flying height of 1 μm or more. In the low flying mode, the slider flies with the originally designed flying height. A parameter for this bi-stable phenomenon is the suspension load. Increasing the suspension load will increase a margin for bypassing entry in the bi-stable zone. By increasing the load by about 1.5 times or more as much as the existing level, it is possible to increase substantially the margin for bypassing entry in the bi-stable zone.

Figure 7:
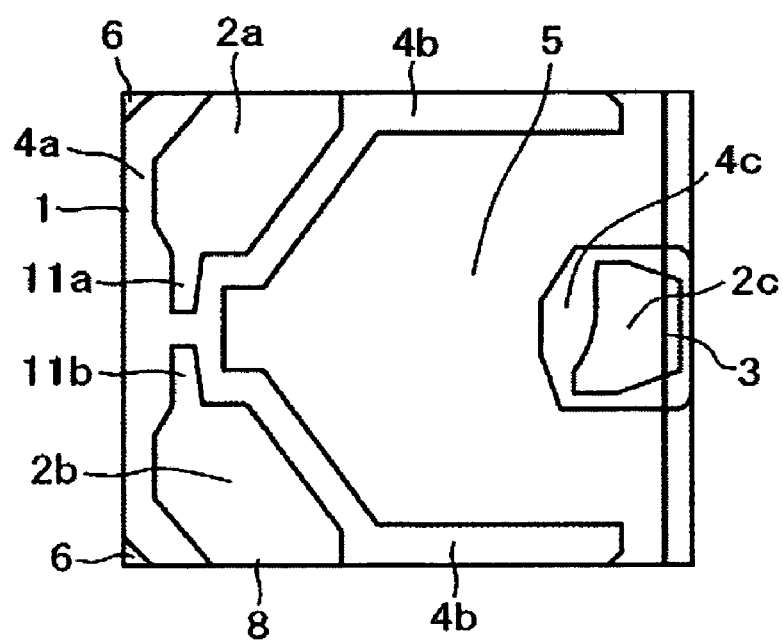
FIG. 7 is a plan view showing air bearing surfaces of a magnetic head slider according to a second embodiment of the present invention.

FIG. 7 is a plan view showing a magnetic head slider according to a second embodiment of the present invention. Two inflow side air bearing surfaces 2a, 2b are not connected to each other but has respective extensions 11a, 11b. The extensions 11a, 11b bring the inflow side air bearing surfaces 2a, 2b closer to each other. In addition to the effect achieved by the first embodiment of the present invention, the second embodiment yields effects of an increased negative pressure and even further enhances the air bearing stiffness in the width direction of the slider. The extensions 11a, 11b are disposed slightly rearward of the inflow end of the inflow side air bearing surfaces 2a, 2b by way of example. The adequate shapes of the inflow side air bearing surfaces make it possible to control the flying attitude of the slider in the width direction. This is true of the connection air bearing surface 7 of the first embodiment.

Figure 8:
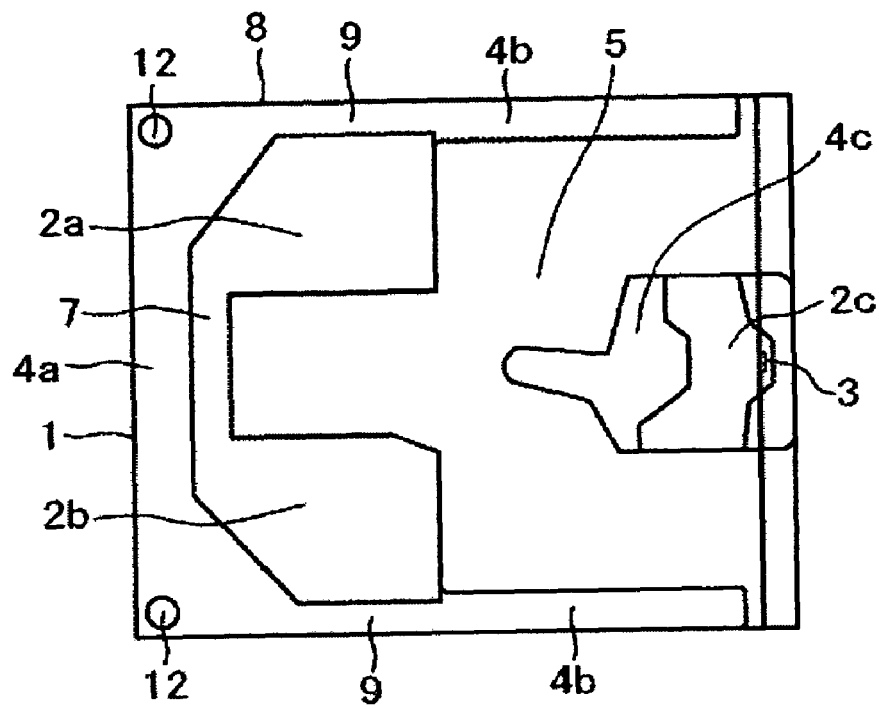
FIG. 8 is a plan view showing air bearing surfaces of a magnetic head slider according to a third embodiment of the present invention.

FIG. 8 is a plan view of a magnetic head slider according to a third embodiment of the present invention. The magnetic head slider of the third embodiment is formed with an inflow side shallowly grooved surface 4a, lateral shallowly grooved surface air bearing surfaces 9, and side shallowly grooved surfaces 4b, which are each disposed in contact with the corresponding one of end faces on both sides of the slider 1. Further, the slider 1 includes inflow end pads 12 disposed on both sides of the air inflow end. The inflow end pads 12 are formed through ion milling or the like. Having no cutting margins provided, the inflow end pads 12 are closest to the respective inflow side corners. According to the third embodiment, the lifting force is increased by the increased width of the air bearing surface by about 1.5 times as compared with the conventional slider. The inflow end pads 12 formed through dry etching have smooth corners. Accordingly, an area of contact between the inflow end of the slider and the disk is small and the contact therebetween is soft during loading/unloading. Disk damage can therefore be reduced. In addition, should the entire inflow side contact the medium, air flows in through an opening provided by the shallow groove depth. This allows the slider to recover stable flying quickly. The lateral shallowly grooved surface air bearing surfaces 9 have an effect of enhancing bearing characteristics obtained when a skew angle (an angle formed between the direction of spinning disk and the longitudinal direction of the slider) is formed. In addition, the lateral shallowly grooved air bearing surfaces 9 have an effect of stabilizing the flying attitude in the width direction with respect to variations in the width direction of the air bearing surfaces caused by the positional deviation of an ion milling mask. To exhibit the performance as above, preferably the lateral shallowly grooved surface air bearing surface 9 has a width within a range from about 15 to 20 μm.

Figure 9:
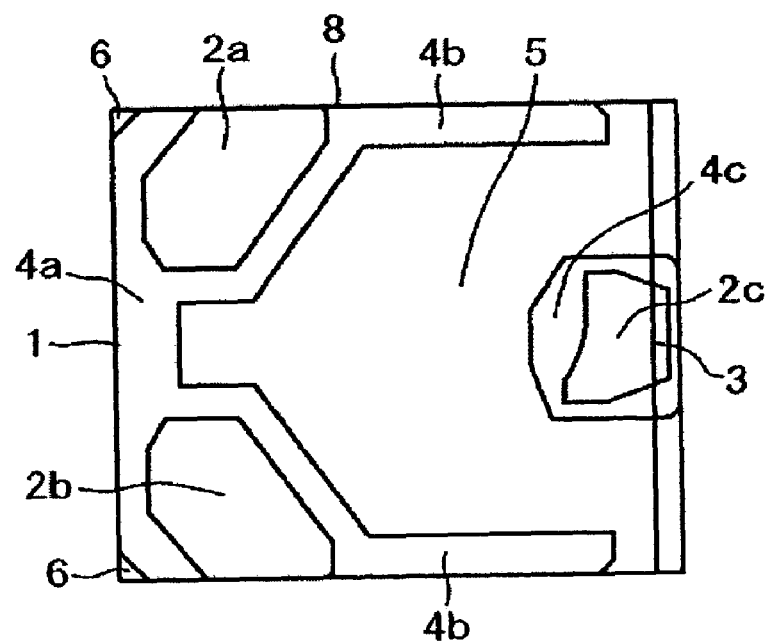
FIG. 9 is a plan view showing air bearing surfaces of a magnetic head slider according to a fourth embodiment of the present invention.

FIG. 9 is a plan view of a magnetic head slider according to a fourth embodiment of the present invention. In the magnetic head slider of the fourth embodiment, inflow side air bearing surfaces 2a, 2b are spaced apart from each other, placed on respective sides. The inflow side air bearing surfaces 2a, 2b are surrounded by a shallowly grooved surface 4a except along the two sides of the slider. In the same manner as in the first embodiment, corner deeply grooved surfaces 6 having the same depth as the deeply grooved surface 5 are respectively disposed only at corners on both sides of the inflow side. According to the fourth preferred embodiment, the lifting force is increased by the increased width of the air bearing surface by about 1.5 times as large as that of the conventional slider.

Figure 10:
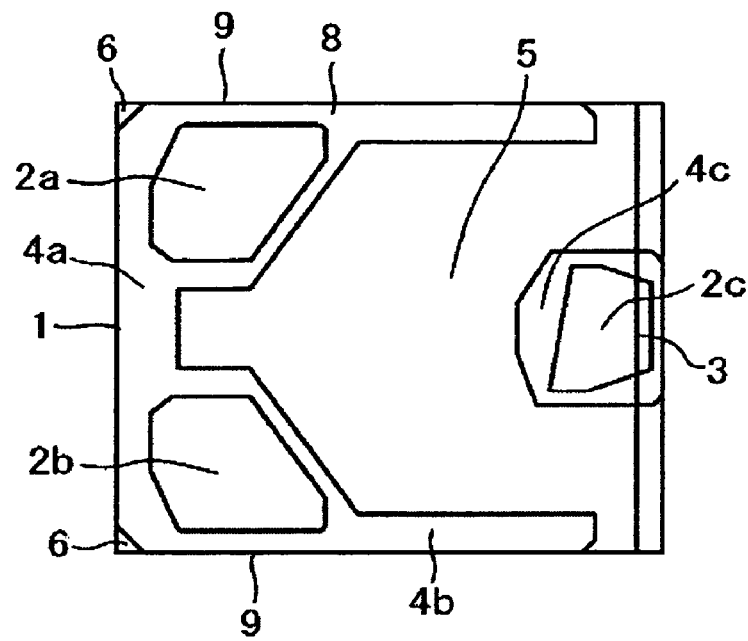
FIG. 10 is a plan view showing air bearing surfaces of a magnetic head slider according to a fifth embodiment of the present invention.

FIG. 10 is a plan view of a magnetic head slider according to a fifth embodiment of the present invention. In the magnetic head slider of the fifth embodiment, an inflow side shallowly grooved surface 4a, lateral shallowly grooved surface air bearing surfaces 9, and side shallowly grooved surfaces 4b are each disposed in contact with the corresponding one of end faces on both sides of the slider 1. Corner deeply grooved surfaces 6 having the same depth as the deeply grooved surface 5 are respectively disposed only at corners on both sides of the inflow side. According to the fifth embodiment, the lifting force is also increased by the increased width of the air bearing surface by about 1.5 times as large as that of the conventional slider.

Figure 11A:
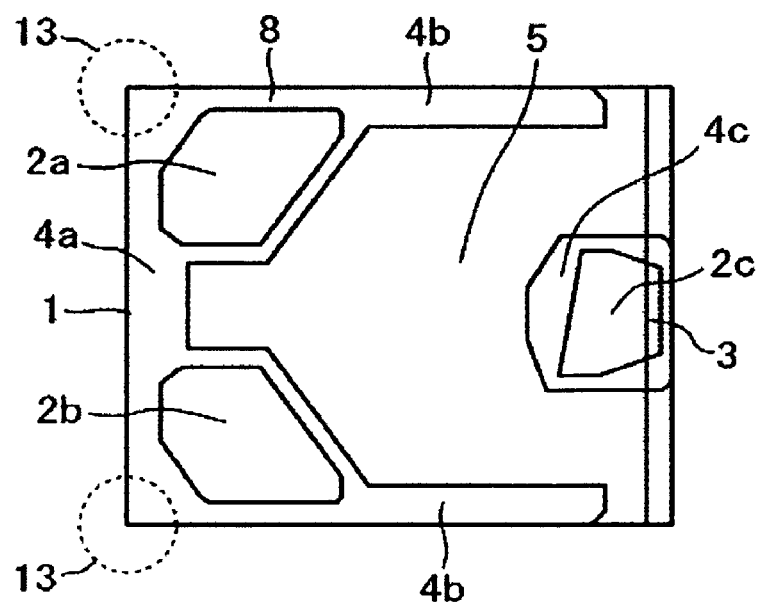
FIG. 11A is a plan view showing air bearing surfaces of a magnetic head slider according to a sixth embodiment of the present invention.
Figure 13:
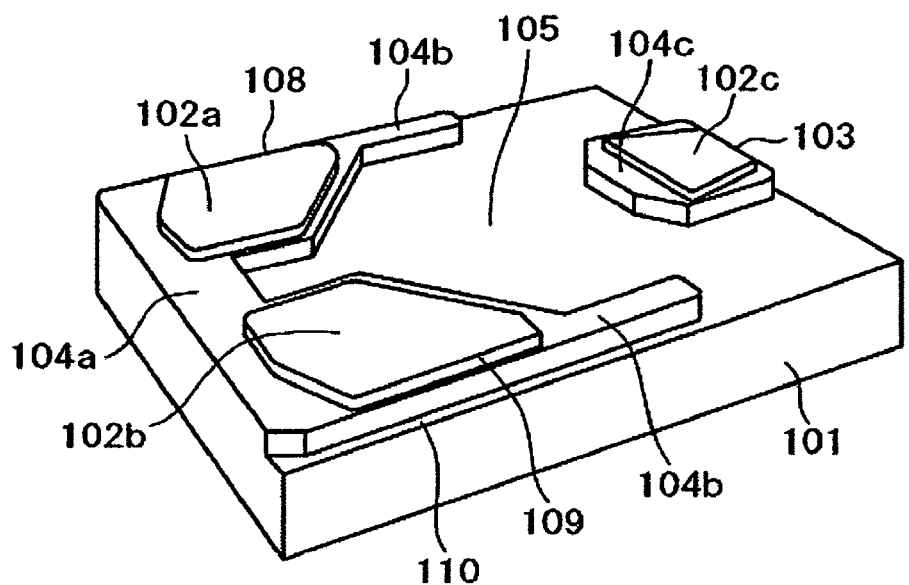
FIG. 13 is a perspective view showing air bearing surfaces of a conventional magnetic head slider using both a positive pressure and a negative pressure.

FIG. 11A is a plan view of a magnetic head slider according to a sixth embodiment of the present invention. FIG. 11B is an enlarged cross-sectional view of the inflow end of FIG. 11A. The magnetic head slider of the sixth embodiment shares the same basic construction as the slider according to the fifth embodiment, except that the inflow side end faces of the slider of the sixth embodiment are chamfered as denoted by reference numeral 13. The chamfered corners 13 substantially lessen contact damage to the medium, should the corners contact the medium due to vibration of the slider during loading/unloading. A head crash can therefore be avoided.

FIG. 12 is a view showing a magnetic disk drive, in which the magnetic head slider according to each of the first to sixth embodiments of the present invention as described above is incorporated. A magnetic head slider 1 flies above a spinning magnetic disk 18. The magnetic head slider 1 is supported by a flexure 15 attached to a suspension 14. The magnetic head slider 1 is positioned correctly at a prescribed location of the magnetic disk 18 by an actuator 17 so as to write and read information. When the magnetic disk 18 is to be brought to a stop, the magnetic head slider 1 is unloaded to a load/unload ramp 19 outside the magnetic disk. Since the suspension load of the magnetic head slider 1 can be increased, the magnetic disk drive can offer an enhanced shock resistance characteristic during its operation.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head slider, comprising:
   a slider including:
   two air bearing surfaces disposed respectively in contact with both ends, on an air inflow side, of a medium opposing surface;
   a connection air bearing surface configured to connect the two air bearing surfaces together on the air inflow side, wherein the two air bearing surfaces are level with the connection air bearing surface;
   a shallowly grooved surface disposed in contact with both the ends of the medium opposing surface between the two air bearing surfaces and the connection air bearing surface, and an air inflow end of the medium opposing surface;
   side shallowly grooved surfaces disposed respectively rearward of the two air bearing surfaces and in contact with both the ends of the medium opposing surface, and extending to points near an air outflow end of the medium opposing surface;
   a center air bearing surface disposed at a central portion in a width direction on the air outflow end of the medium opposing surface;
   a center shallowly grooved surface disposed on an air inflow side of the center air bearing surface; and
   a deeply grooved surface surrounded substantially by the two air bearing surfaces, the connection air bearing surface, the side shallowly grooved surfaces, and the center air bearing surface; and
   a magnetic head disposed on the center air bearing surface;
   wherein the ends of the medium opposing surface are respective end faces in the width direction of the slider, and
   wherein the slider has a width of about 0.8 mm or less and the medium opposing surface is flat or protrudent in the width direction.

2. The magnetic head slider according to claim 1, wherein the slider has a length of about 0.85 mm, a width of about 0.7 mm, and a height of about 0.23 mm.

3. The magnetic head slider according to claim 1, wherein a depth from the two air bearing surfaces to the shallowly grooved surface is 160 nm or less, a depth from the center air bearing surface to the center shallowly grooved surface is 160 nm or less, and a depth from the two air bearing surfaces and the center air bearing surface to the deeply grooved surface is 900 nm or less.

4. The magnetic head slider according to claim 1, wherein the slider has corner deeply grooved surfaces, at the respective both ends on the air inflow end, which are deeper than the shallowly grooved surface.

5. The magnetic head slider according to claim 4, wherein the corner deeply grooved surfaces are as deep as the deeply grooved surface.

6. A magnetic head slider, comprising:
   a slider including:
   two air bearing surfaces disposed respectively in contact with both ends, on an air inflow side, of a medium opposing surface;
   a shallowly grooved surface disposed around the two air bearing surfaces and in contact with an air inflow end and both the ends of the medium opposing surface;
   side shallowly grooved surfaces disposed rearward of the two air bearing surfaces and in contact with both the ends of the medium opposing surface, so as to cover areas up to points near an air outflow end of the medium opposing surface;
   a center air bearing surface disposed at a central portion in a width direction on the air outflow end of the medium opposing surface;
   a center shallowly grooved surface disposed on an air inflow side of the center air bearing surface; and
   a deeply grooved surface surrounded substantially by the shallowly grooved surface, the side shallowly grooved surfaces, and the center air bearing surface; and
   a magnetic head disposed on the center air bearing surface;
   wherein the ends of the medium opposing surface are respective end faces in the width direction of the slider,
   wherein the slider has a width of about 0.8 mm or less and the medium opposing surface is flat or protrudent in the width direction, and
   wherein the slider further includes extensions extending from the respective two air bearing surfaces toward each other in such a manner as to be opposite to and separated from each other by the shallowly grooved surface.

7. The magnetic head slider according to claim 6, wherein the slider has corner deeply grooved surfaces, at the respective both ends on the air inflow end, which are deeper than the shallowly grooved surface.

8. The magnetic head slider according to claim 7, wherein the corner deeply grooved surfaces are as deep as the deeply grooved surface.

9. The magnetic head slider according to claim 6, wherein both ends on the air inflow end include corner deeply grooved surfaces that are deeper than the shallowly grooved surface.

10. A magnetic head slider, comprising:
    a slider including:
    two air bearing surfaces disposed respectively on both sides on an air inflow side of a medium opposing surface;
    a connection air bearing surface configured to connect the two air bearing surfaces together on the air inflow side, wherein the two air bearing surfaces are level with the connection air bearing surface and the highest protrusion in the medium opposing surface;
    a shallowly grooved surface disposed in contact with both ends of the medium opposing surface between the two air bearing surfaces and the connection air bearing surface, and an air inflow end of the medium opposing surface;
    lateral shallowly grooved surfaces disposed respectively on both sides of the two air bearing surfaces and in contact with both the ends of the medium opposing surface;
    side shallowly grooved surfaces disposed respectively rearward of the two air bearing surfaces and in contact with both the ends of the medium opposing surface, so as to cover areas up to points near an air outflow end of the medium opposing surface;
    a center air bearing surface disposed at a central portion in a width direction on the air outflow end of the medium opposing surface;
    a center shallowly grooved surface disposed on an air inflow side of the center air bearing surface; and
    a deeply grooved surface surrounded substantially by the two air bearing surfaces, the connection air bearing surface, the side shallowly grooved surfaces, and the center air bearing surface; and
    a magnetic head disposed on the center air bearing surface;
    wherein the slider has a width of about 0.8 mm or less and the medium opposing surface is flat or protrudent in the width direction.

11. The magnetic head slider according to claim 10, wherein the slider further includes inflow end pads disposed on the shallowly grooved surface respectively near both ends of the air inflow end.

12. A magnetic head slider, comprising:
a slider including:
two air bearing surfaces disposed respectively on both sides on an air inflow side of a medium opposing surface;
a shallowly grooved surface disposed around the two air bearing surfaces and in contact with an air inflow end and both ends of the medium opposing surface;
side shallowly grooved surfaces disposed rearward of the two air bearing surfaces and in contact with both the ends of the medium opposing surface, so as to cover areas up to points near an air outflow end of the medium opposing surface;
a center air bearing surface disposed at a central portion in a width direction on the air outflow end of the medium opposing surface;
a center shallowly grooved surface disposed on an air inflow side of the center air bearing surface; and
a deeply grooved surface surrounded substantially by the shallowly grooved surface, the side shallowly grooved surfaces, and the center air bearing surface; and
a magnetic head disposed on the center air bearing surface;
wherein the slider has a width of about 0.8 mm or less and the medium opposing surface is flat or protrudent in the width direction, and
wherein the air inflow end of the slider is rounded at each end portion thereof.

13. The magnetic head slider according to claim 12, wherein the slider has corner deeply grooved surfaces, at the respective both ends on the air inflow end, which are deeper than the shallowly grooved surface.

14. The magnetic head slider according to claim 13, wherein the corner deeply grooved surfaces are as deep as the deeply grooved surface.

15. A magnetic disk drive, comprising:
a magnetic head slider of claim 1; and
a magnetic disk, to which data is written, or from which data is read by the magnetic head slider.

16. The magnetic disk drive according to claim 15, wherein the magnetic disk has a diameter of 45.7 mm or less.

* * * * *

UNITED STATES PATENT AND TRADEMARK OFFICE
CERTIFICATE OF CORRECTION

| | | |
|---|---|---|
| PATENT NO. | : 7,580,224 B2 | Page 1 of 1 |
| APPLICATION NO. | : 11/282155 | |
| DATED | : August 25, 2009 | |
| INVENTOR(S) | : Takeuchi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 658 days.

Signed and Sealed this

Fourteenth Day of September, 2010

David J. Kappos
*Director of the United States Patent and Trademark Office*